Dec. 27, 1949     P. A. JACOBSON     2,492,222
SAUSAGE MACHINE
Filed June 17, 1946     5 Sheets-Sheet 1
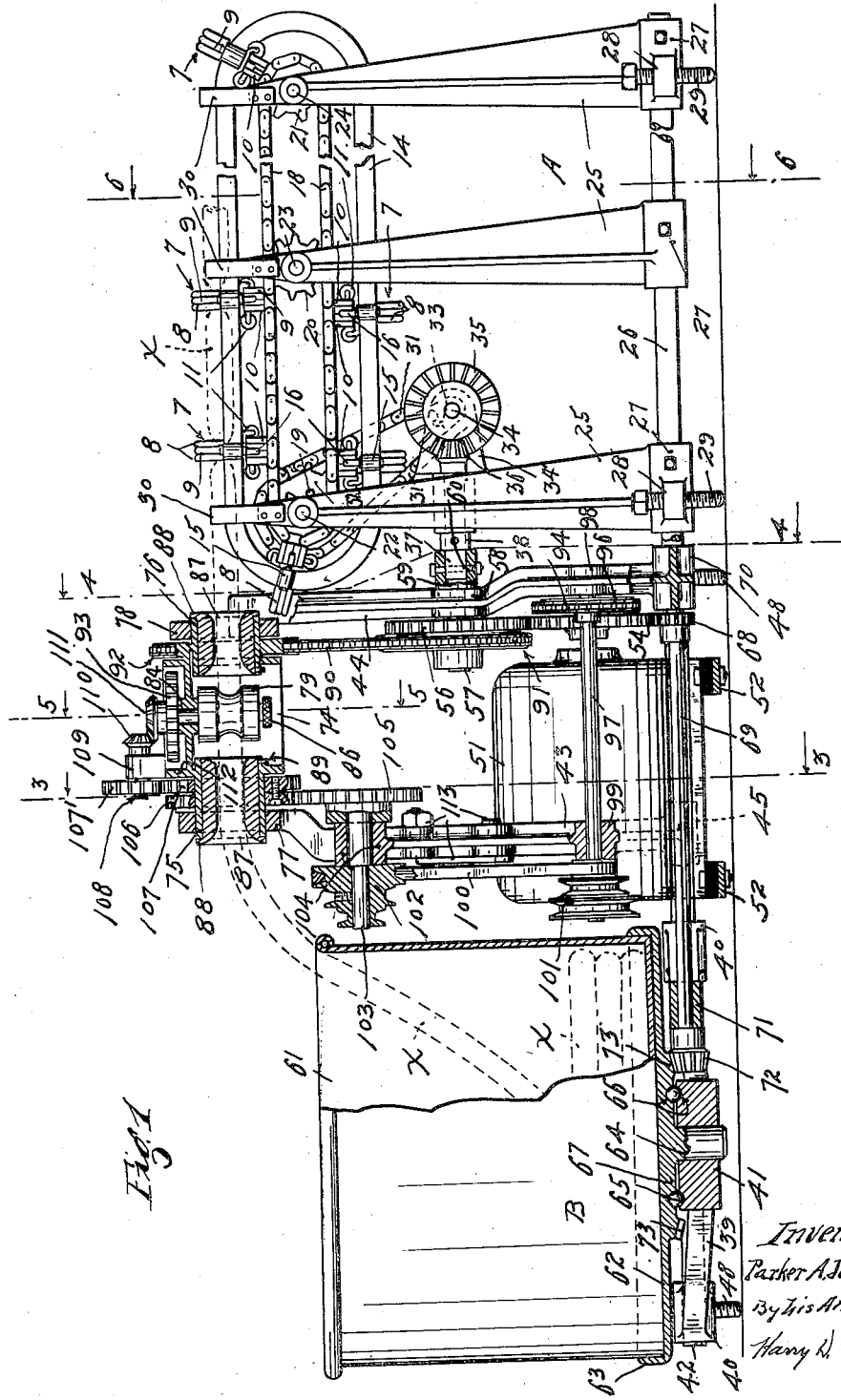
Inventor
Parker A Jacobson
By his Attorney
Harry W. Kilgore

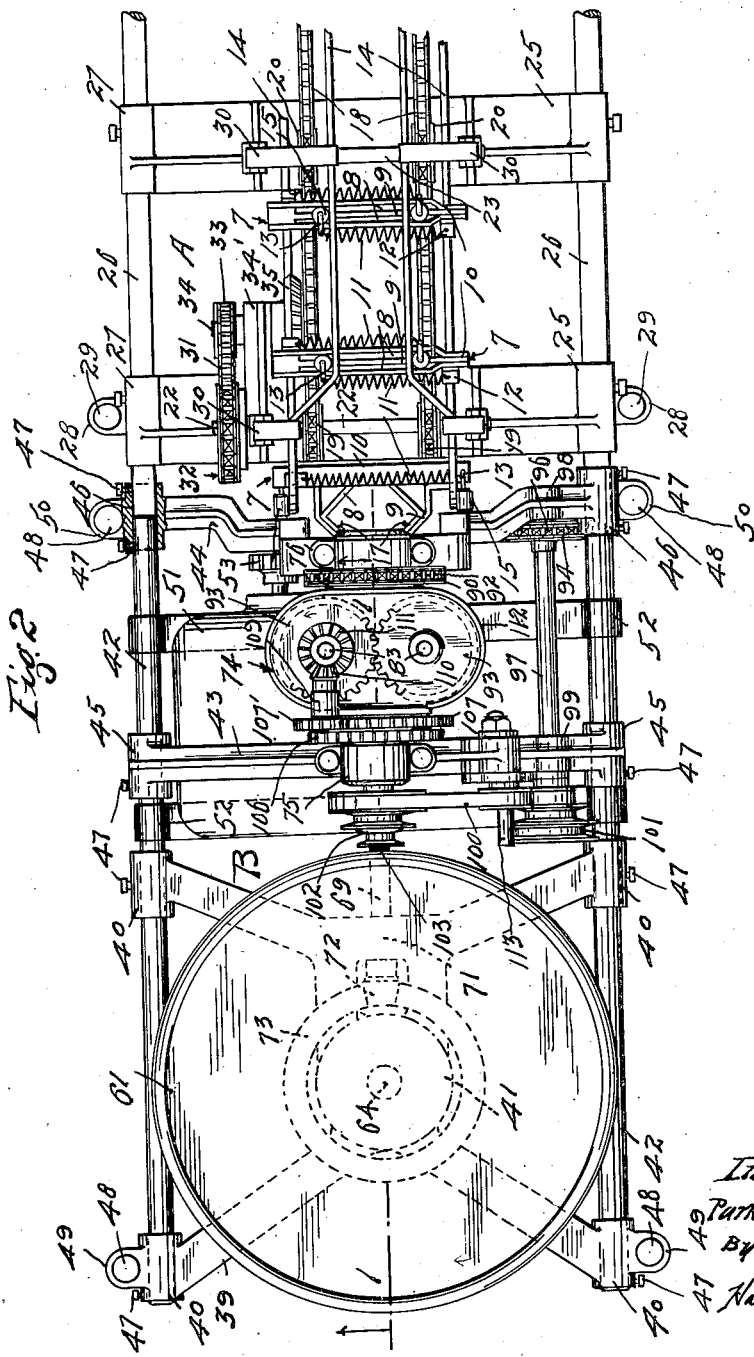

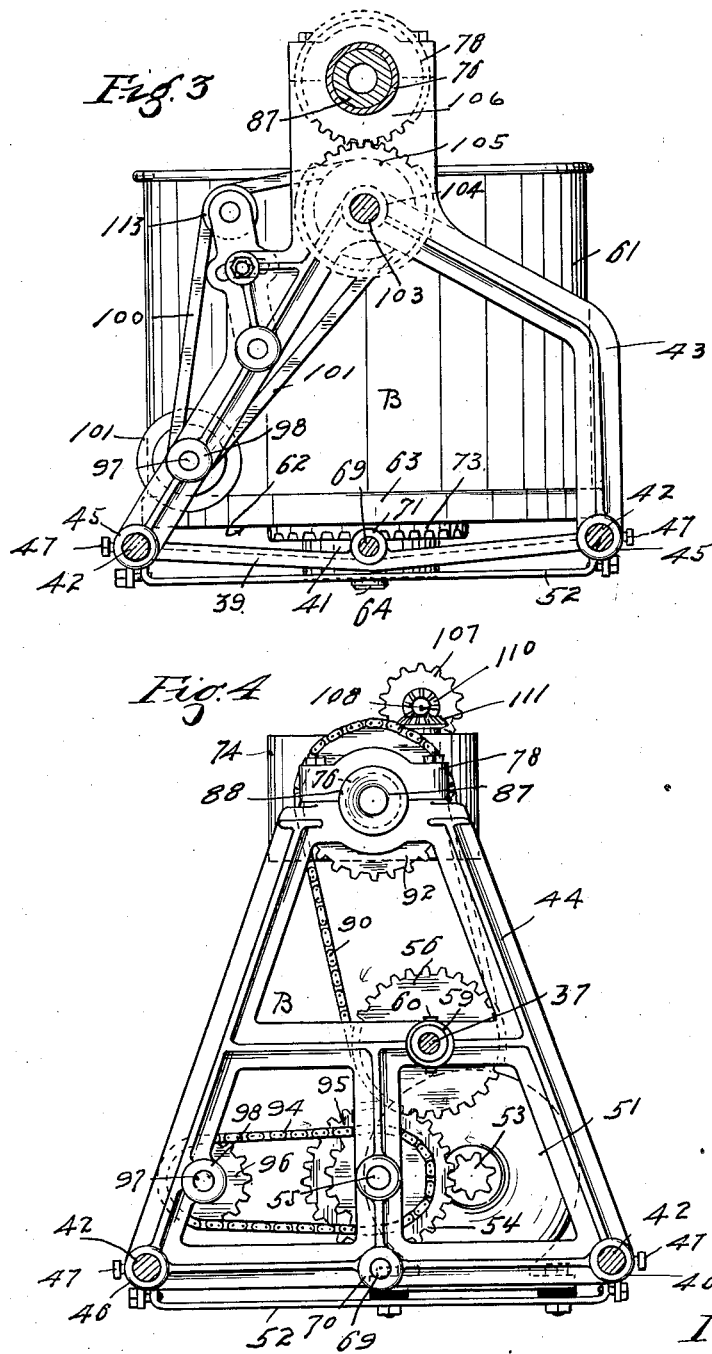

Dec. 27, 1949 P. A. JACOBSON 2,492,222
SAUSAGE MACHINE
Filed June 17, 1946 5 Sheets-Sheet 4

Inventor
Parker A. Jacobson
By His Attorney
Harry W. Kilgore

Dec. 27, 1949 P. A. JACOBSON 2,492,222
SAUSAGE MACHINE
Filed June 17, 1946 5 Sheets-Sheet 5

INVENTOR.
Parker A. Jacobson
By his Attorney
Harry D. Kilgore

Patented Dec. 27, 1949

2,492,222

UNITED STATES PATENT OFFICE 2,492,222

SAUSAGE MACHINE

Parker A. Jacobson, Evanston, Ill.

Application June 17, 1946, Serial No. 677,138

10 Claims. (Cl. 17—34)

My present invention relates to improvements in sausage machines and more particularly to such a machine for feeding and twisting a stuffed sausage casing during the process of forming the same into links.

An object of this invention is to provide a simple and highly efficient machine for feeding a stuffed sausage casing to a conveying and pinching machine that successively forms said casing into links, and for twisting said casing, at the outer end of the last formed link therein, by turning the unlinked section of said casing about its longitudinal axis while the linked section thereof is held from turning by said conveying and twisting machine.

A further object of this invention is to provide novel means, coordinated with the feeding and twisting machine for turning of the unlinked section of the stuffed sausage casing synchronous with the turning thereof by said feeding and twisting machine.

Other objects of the invention will be apparent from the following description reference being had to the drawings.

To the above end, generally stated, the invention consists of the novel devices and combination of devices hereinafter described and defined in the claims.

In the accompanying drawings, which illustrate the invention, like characters indicate like parts throughout the several views.

Referring to the drawings:

Fig. 1 is a fragmentary view partly in side elevation and partly in central vertical section taken on the line 1—1 of Fig. 2;

Fig. 2 is a plan view of the parts shown in Fig. 1, but somewhat more fragmentary;

Figure 6:
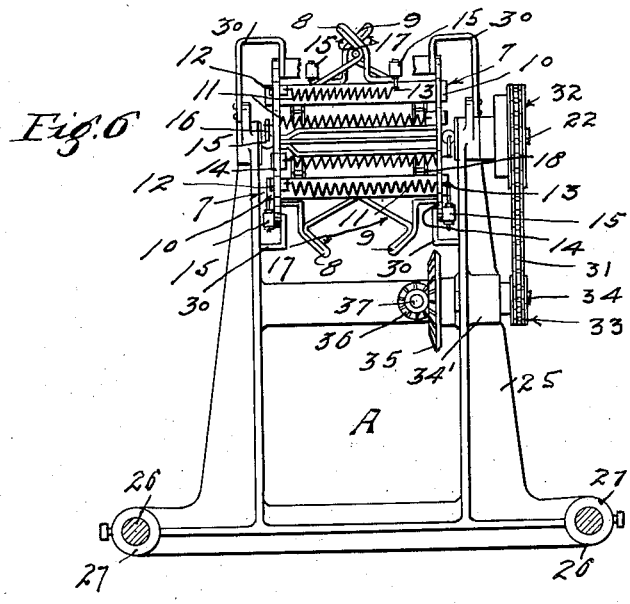
Figure 5:
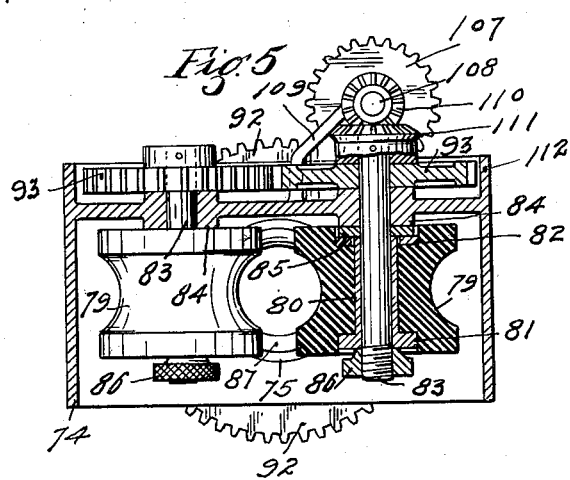
Figure 7:
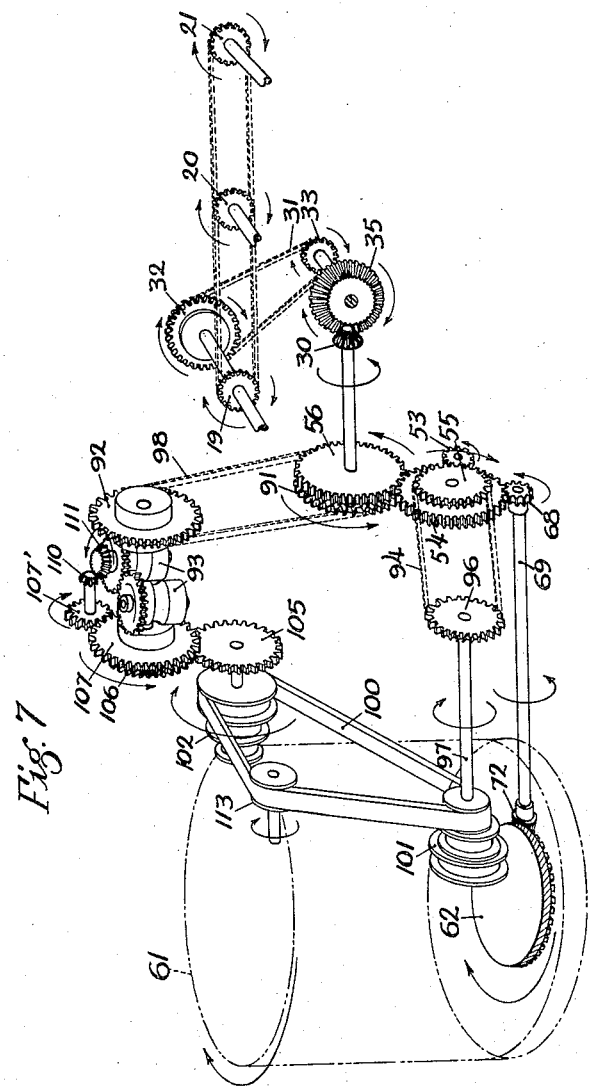

Figs. 3 and 4 are views partly in end elevation and partly in section taken on the lines 3—3 and 4—4 of Fig. 1, respectively;

Fig. 5 is a detail view partly in elevation and partly in section taken on the line 5—5 of Fig. 1 on an enlarged scale;

Fig. 6 is a view partly in end elevation and partly in section taken on the line 6—6 of Fig. 1, and Fig. 7 is a diagrammatic illustration of the driving mechanism.

My present invention must necessarily be used in connection with a machine for conveying a stuffed sausage casing longitudinally and at the same time form the same into links by successively pinching the same, at longitudinally spaced points, to displace the stuffing therein by forcing the same in opposite directions in the casing and gathering the casing into a compact mass at the longitudinal axis of the respective link. While the gathered portion of the casing is being held pinched the gathered portion thereof must be tightly twisted so the respective link will keep its form and not untwist when the pinching force is removed.

It is to this feeding and twisting of a stuffed sausage casing that my present invention appertains.

For the sake of brevity, the conveying and pinching machine will hereinafter be referred to as machine "A," and the feeding and twisting machine will be referred to as machine "B."

It is thought that the present invention will be best understood by first describing machine "A" wherein the same includes a series of traveling pinching units 7. Each unit 7 includes a pair of cooperating opposing jaws 8 and 9 mounted in a transverse horizontally disposed channel member 10, for sliding movement toward and from each other. The jaw 8 of each unit 7 includes two duplicate, laterally spaced members and the jaw 9 thereof extends therebetween.

A pair of reversely acting coiled springs 11 are under strain to close the jaws 8 and 9. Each spring 11 is anchored at one of its ends to a bracket 12 on the channel member 10 and attached at its other end to the outer end of one of the jaws 8 and 9, as indicated at 13.

The opening and closing of the yieldingly held jaws 8 and 9 is controlled by a pair of laterally spaced, cam-acting flat rails 14 and rollers 15 that travel on the outer sides of said rails. These rollers 15 are journalled on upstanding trunnions 16 on the outer end portions of the jaws 8 and 9. Obviously, the opposing springs 11 are under strain to close the jaws 8 and 9 and thereby yieldingly hold the rollers 15 against the rails 14.

The jaws 8 and 9 have opposing V-shaped surfaces which, when said jaws are closed, pinch a stuffed sausage casing X extending longitudinally therebetween as indicated by broken lines in Fig. 1, squeeze the stuffing therein and force the same in opposite directions in the casing X to separate the same into links. When the jaws 8 and 9 are closed, their V-shaped surfaces 17 form a small, substantially round hole in which only the casing X is gathered.

The units 7 are moved in an endless course by a pair of laterally spaced conveyor chains 18 that run over inner, intermediate and outer pairs of sprocket wheels 19 and 20 and 21. The sprocket wheels 19 are on a driven shaft 22 and the sprocket wheels 20 and 21 are on idle shafts 23 and 24 respectively. The shafts 22, 23 and 24 are journalled in bearings on three separate frames 25 spaced longitudinally of machine "A." These frames 25 are rigidly connected by a pair of laterally spaced base rods 26 that extend through sleeve bearings 27 on said frames.

The sleeve bearings 27 on the inner and outer frames 25 have outstanding lugs 28 with which leveling screws 29 have threaded engagement. These screws 29 act as supports for machine "A." Brackets 30 attach the rails 14 to the frames 25.

The channel members 10 extend transversely over and outwardly of the two conveyor chains 18 and are attached thereto. The units 7 are spaced the one in advance of the other and the distance therebetween determines the length of the links into which the casing X is divided.

The shaft 22 is driven from an electric motor on machine "B," as will hereinafter appear, by connections, certain of which are on machine "A" and are as follows, to wit: A sprocket chain 31 runs over a large sprocket wheel 32 on the shaft 22, and a small sprocket wheel 33 on one end of a short shaft 34 intermediately journalled on a bearing 34' on the inner frame 25. On the other end of the shaft 34 is a large bevel gear 35 that meshes with a pinion 36 on a short shaft 37, intermediately journalled in a bearing on the inner frame 25. A collar 38 on the opposite end of the shaft 37 from the pinion 36, together with said pinion hold the shaft 37 against endwise movement in its bearing. The shaft 37, outwardly of the collar 38, is coupled to the balance of the driving connections from the motor to the shaft 22 which are on machine "A," as will presently appear.

Referring now in detail to my present invention, to wit: Machine "A." coordinated with machine "B," just described.

The numeral 39 indicates a horizontally disposed skeleton base having four sleeve bearings 40 in rectangular arrangement. This base 39 has at its center a large upstanding hub 41. A pair of base rods 42 is mounted in the sleeve bearings 40 and rigidly secured thereto. These base rods 42 are axially aligned with the base rods 26 of machine "A" and coupled thereto, as will presently appear.

Between the base 39 and machine "A" is an outer frame 43 and an inner frame 44. These two frames 43 and 44 have on their bottom portions sleeve bearings 45 and 46 respectively through which the base rods 42 extend. The adjacent end portions of the base rods 26 and 42 extend into the bearing sleeves 46 from opposite ends thereof. Set-screws 47 have threaded engagement with the bearing sleeves 40, 45, and 46. Certain of these set-screws 47 impinge the base rods 42 and rigidly connect the base 39 and the frames 43 and 44 thereto. The other set-screws 47 impinge the base rods 26 which extend into the bearing sleeves 46 from the opposite ends thereof from the base rod 42. Obviously the two machines "A" and "B" are separably connected at the bearing sleeves 46.

Machine "B" is supported by pairs of levelling screws 48. One pair of these screws 48 have threaded engagement with outstanding lugs 49 on the outermost pair of sleeve bearing 40 and the other pair thereof have threaded engagement with outstanding lugs 50 in the sleeve bearings 46.

An electric motor 51 is mounted on a bed 52 comprising a pair of cross-tie bars secured to the base rods 42. On the armature shaft of the motor 51 is a spur pinion 53 that meshes with a spur gear 54 journalled on a stub shaft 55 on the frame 44. The gear 54 meshes with a gear 56 on the outer end portion of a short shaft 57 intermediately journalled on a bearing 58 on the frame 44. On the inner end of the shaft 57 is a hub 59 into which the outer end portion of the shaft 37 projects, and is detachably secured thereto by a nut-equipped bolt 60. This completes the driving connection from the motor 51, on machine "B," to the conveyor chains 18 for the units 7, on machine "A."

A tub-like receptacle 61 is provided for holding an unlinked stuffed sausage casing X to be drawn therefrom and fed to machine "A," to be formed thereby into links. This receptacle 61 is removably mounted on a turntable 62 having an upstanding flange 63 within which said receptacle is snugly fitted and frictionally held thereby for rotation with said turntable. On the underside of the turntable 62 is a depending central trunnion 64 journalled in the hub 59. Anti-friction ball bearings 65 are mounted in ball races 66 in a boss 67 on the under side of the turntable 62 and the upper end of the hub 41 and support said turntable on the base 39.

The turntable 62, hence the receptacle 61, is rotated by the following connections, to wit: The gear 54, driven from the motor 51, meshes with a spur pinion 68 on the inner end of a countershaft 69 journalled in a bearing 70 on the frame 44, and a bearing 71 on the base 39. On the outer end of the shaft 69 is a bevel pinion 72 that meshes with a ring gear 73 on the under side of the turntable 62 concentric with the trunnion 64.

The hereinafter described mechanism is provided for withdrawing the stuffed sausage casing X, to be formed into links, from the receptacle 61 for feeding the same to machine "A" and for turning the casing X about its longitudinal axis to twist the same at the outer end of the last formed link therein, while said link is being held from turning by the jaws 8 and 9 of one of the units 7, to wit: A box-like frame or housing 74, having an open bottom, is provided at its end with a pair of large tubular trunnions 75 and 76, journalled in bearings 77 and 78 on the upper ends of the frames 43 and 44, respectively. These trunnions 75 and 76 are axially aligned with the opening formed by a pair of the jaws 8 and 9 when pinching the sausage casing X to form a link therein.

It has been assumed that the housing 74 is positioned, as shown, particularly in Figs. 1 and 5, when reference was made to its open bottom and it will be understood that said housing is in this same position when further reference is made thereto or to parts carried thereby.

Within the housing 74 is a pair of upright, laterally spaced combined gripping and feeding rollers 79 having concave peripheries. These rolls 79 are made of relatively soft rubber so as to not break the sausage casing X, but at the same time afford good gripping surfaces. Each roll 79 has an axial metal bushing 80 provided on its lower end with an outturned flange 81 and on its upper end a loose washer 82.

The rolls 79 are mounted on a pair of depending parallel shafts 83 journalled above said rolls in bearings 84 on the top of the housing 74. To hold the rolls 79 for rotation with the shafts 83 their bushings 80 are endwise clamped between fixed collars on the shafts 83 and knurled thumb-nuts 86 on the screw threaded lower end portions of the shafts 83. The collars 85 have a working clearance with the bearings 84, see Fig. 5.

The opposing faces of the rolls 79, in the plane of their axes, are on the arcs of a circle having its center at the aligned projected axes of the tubular trunnions 75 and 76. The diameter of this circle is such that the rolls 79 grip the stuffed sausage casing X, of a given diameter, with sufficient pressure to feed the same longitudinally and at the same time turn the casing X about its axis, as will presently appear.

Bushings 87 are removably mounted in the tubular trunnions 75 and 76 and have on their outer ends outturned annular flanges 88 that engage the respective ends of said trunnions and limit the endwise movement of said bushings into the trunnions 75 and 76. Set-screws 89, having threaded engagement with the trunnions 75 and 76, impinge the bushings 87 and hold the same in place.

In actual usage of the machine "B," interchangeable roll 79 and bushings 87 will be provided for stuffed sausage casings of different diameters.

The housing 74 is rotated about the axes of the trunnions 75 and 76 by the following connections, to wit: A sprocket chain 90 runs over a sprocket wheel 91 secured to the spur gear 56 and a sprocket wheel 92 in the trunnion 76.

The rolls 79 are rotated in opposite directions and at the same speed by a pair of meshing spur gears 93 on the shafts 83 above the housing 74. One of these gears 93 is driven by the following connections, to wit: A sprocket chain 94 runs over a sprocket wheel 95 secured to the gear 54 and a smaller gear 96 on the inner end portion of a shaft 97 journalled in a bearing 98 on the frame 44 and a bearing 99 on the frame 43. A V-belt 100 runs over a step pulley 101 on the outer end the shaft 97 and a step pulley 102 on the outer end portion of a short shaft 103 intermediately journalled in a bearing 104 on the frame 43. A spur gear 105 on the inner end of the shaft 103 meshes with a spur gear 106 journalled in the tubular trunnion 75. Also journalled on the trunnion 75 and secured to the gear 106 for rotation therewith is a spur gear 107. This gear 107 meshes with a spur pinion 107' mounted on the outer end portion of a short shaft 108 intermediately journalled in a bearing 109 on the top of the housing 74. On the inner end portion of the shaft 108 is a bevel pinion 110 that meshes with a bevel gear 111 on one of the shafts 83.

On top of the housing 74 is an upstanding endless guard flange 112 within which the gears 93 operate.

A belt tightener 113 for the V-belt 100 is mounted on the frame 43.

It may be stated that the rolls 79 feed the casing X to the units 7 at the same speed at which said casing X is conveyed by the units 7. The unlinked portion of the casing X in the receptacle 61 is turned bodily at the same speed at which it is turned by the rolls 79 so that there is no twist in said casing X between the receptacle 61 and the rolls 79 and hence remains straight.

*Operation*

A stuffed sausage casing X is to be formed into links, is coiled in the receptacle 61 about the axis thereof. One end of the casing X is then inserted through the outermost bushing 87 and placed between the rolls 79. While the casing X is thus held the rolls 79 are rotated to feed the casing therebetween and through the innermost bushing 87 by pulling on the V-belt 100.

The end portion of the casing projecting outwardly of the innermost bushing 87 is next held in a position to be pinched by the jaws 8 and 9 of the upwardly and outwardly moving unit 7. After the casing X has been pinched and held by the jaws 8 and 9 of one of the units 7, the motor 51 is started and from this time on the forming of the links in the casing X and the twisting thereof is entirely automatic.

As shown in the drawings, see Fig. 7, the frame 74 is rotated anti-clockwise to turn the casing X extending through the bushings 87 and being fed longitudinally by the rolls 79 to the link forming jaws 8 and 9 which hold the link portion of the casing X from turning. This rotation of the frame 74 twists the casing X at the last formed link. To counteract this twisting of the respective portion of the casing X, the receptacle 61 is rotated clockwise to turn the unlinked portion of the casing as it leaves said receptacle at the same speed at which sections of the casing X in the bushings 87 is being turned.

It will be understood that the invention described is capable of modifications within the scope of the invention hereinafter disclosed and claimed.

What I claim is:

1. The combination with a machine having means for conveying a stuffed sausage casing and for forming the same into links, of a support, a frame having a pair of axially aligned tubular trunnions journalled on the support through which trunnions the unlinked section of the sausage casing is conveyed to said machine, a pair of cooperating rolls journalled on the frame for holding said casing to turn with the trunnions, and means for rotating the frame to turn the unlinked section of said casing and thereby twist the same at the outer end of the last formed link in said casing.

2. The structure defined in claim 1 further including means for rotating the rolls to feed the unlinked section of the casing to said machine.

3. The structure defined in claim 1 further including means for turning the unlinked section of the casing outwardly of the frame to counteract the twisting of said casing.

4. The combination with a machine having means for conveying a stuffed sausage casing and for forming the same into links, of a support, a frame having a pair of axially aligned tubular trunnions journaled on the support through which trunnions the unlinked section of the stuffed sausage casing is conveyed to said machine, a pair of shafts journalled on the frame, rolls removably journalled on the shafts for holding said section of the casing to turn with the trunnions and means for rotating the frame to turn said section of the casing and thereby twist the same at the outer end of the last formed link in said casing.

5. The structure defined in claim 4 further including means for rotating the shafts to rotate the rolls to feed the unlinked section of the casing to the machine.

6. The combination with a machine having means for conveying a stuffed sausage casing and for forming the same into links, of a second machine having means for turning the unlinked section of said casing to twist the same at the outer end of the last formed link therein, separable couplings connecting the two machines, a motor on one of said machines, and driving connections from the motor to said two machines including a separable coupling between the two machines.

7. The structure defined in claim 6 further including means on the second machine for turning the unlinked section of the casing to counteract the twisting thereof, and driving connections from the motor to said turning means.

8. A machine of the class described having means for conveying a stuffed sausage casing and for forming the same into links and holding the respective portions of the casing from turning, means for turning the unlinked portion of the casing at the last formed link to twist the same, and a second means for turning the unlinked sections of the casing before it is acted upon by the first noted turning means in the opposite direction from which it is being turned to twist the same and at the same speed.

9. A machine of the class described having means for conveying a stuffed sausage casing, and for forming the same into links, and holding the respective portions of the casing from turning, means for turning the unlinked portion of the casing at the last formed link to turn the same, and a receptacle for holding the unlinked section of the casing therein, means for rotating the receptacle to turn the unlinked section of the casing as it leaves the receptacle in the opposite direction in which the first noted turning means is twisting the casing and at the same speed.

10. A machine of the class described having means for conveying a stuffed sausage casing, and for forming the same into links, and holding the respective portions of the casing from turning, means for turning the unlinked portion of the casing at the last formed link to twist the same, a turntable, a receptacle removably mounted on the turntable for rotation therewith for holding the unlinked section of the casing thereon, and means for rotating the turntable to turn the unlinked section of the casing as it leaves the receptacle in the opposite direction in which the first noted turning means is twisting the same and at the same speed.

PARKER A. JACOBSON.

REFERENCES CITED

The following references are of record in the file of this patent:

UNITED STATES PATENTS

| Number | Name | Date |
| --- | --- | --- |
| 873,877 | Louden | Dec. 17, 1907 |
| 1,366,183 | Hottmann | Jan. 18, 1921 |
| 1,545,586 | Kruse | July 14, 1925 |
| 1,639,270 | Potter | Aug. 16, 1927 |
| 2,102,917 | Rolland | Dec. 21, 1937 |